Figure 1:
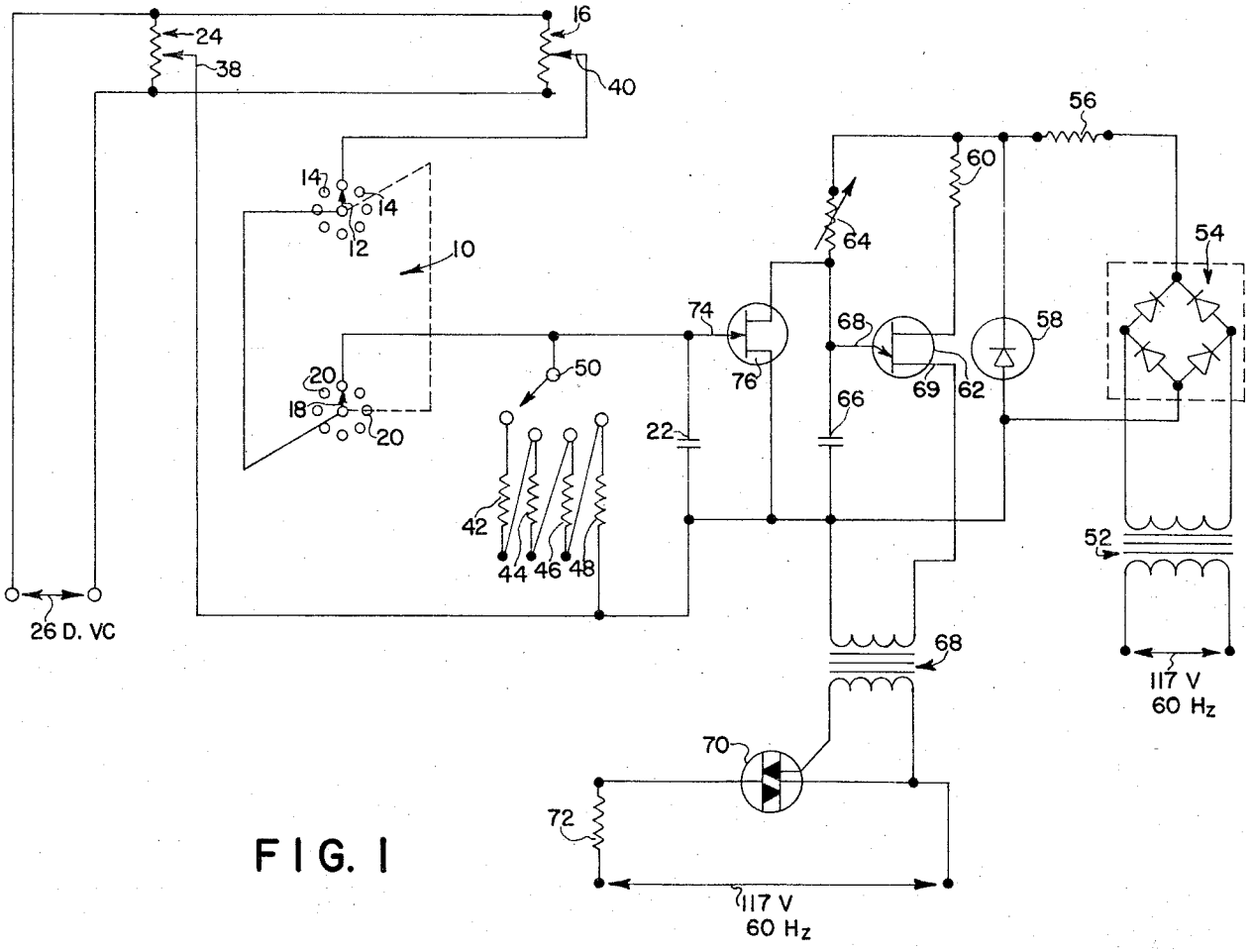
Figure 2:
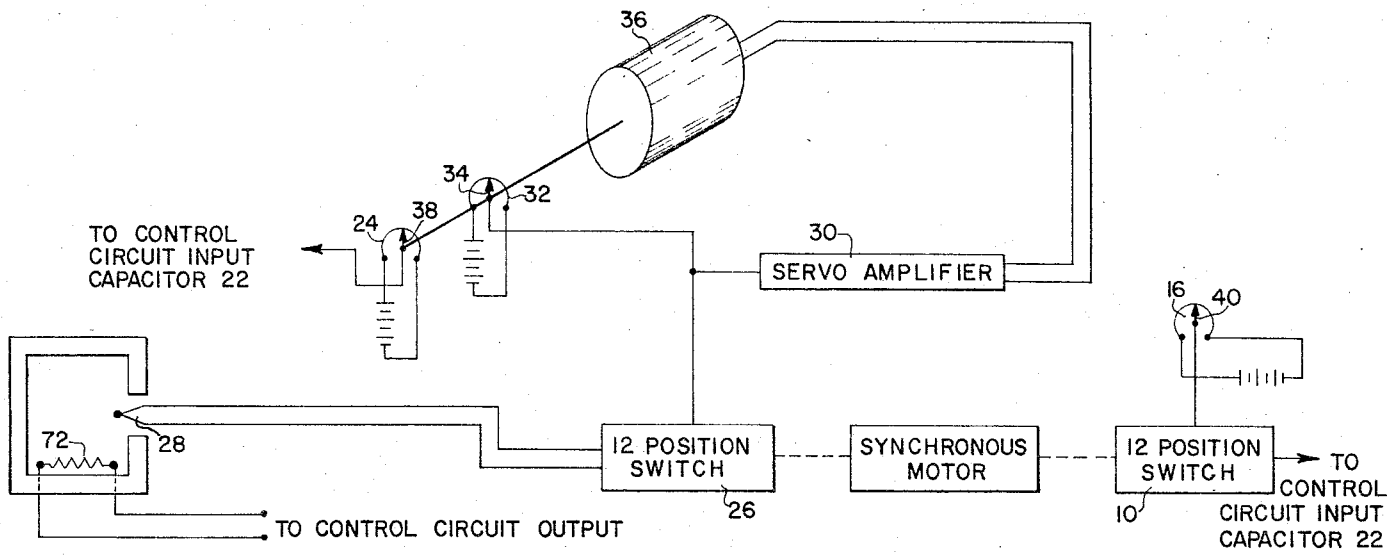

T859,006

DEF. PUB. #728616

SHEET 1 OF 2

FIG. I

JOHN B. ENGLEMAN
*INVENTOR.*

BY William T. French
George P. Chandler
ATTORNEYS

T 859,006

DEF. PUB. #728616

SHEET 2 OF 2

JOHN B. ENGLEMAN
*INVENTOR.*

BY William T. French
George P. Chandler
ATTORNEYS

T 859,006

DEFENSIVE PUBLICATION

UNITED STATES PATENT OFFICE

Published at the request of the applicant or owner in accordance with the Notice of Apr. 11, 1968, 849 O.G. 1221. Identification is by serial number of the application and the heading indicates the number of pages of specification, including claims, and of sheets of drawing contained in the application as originally filed. The file of this application is available to the public for inspection; reproduction may be purchased for 30 cents per sheet.

Applications published under the Defensive Publication Program have not been examined as to the merits of alleged invention. The Patent Office makes no assertion as to the novelty of the disclosed subject matter.

PUBLISHED FEBRUARY 4, 1969

859 O.G. 42

728,616
SOLID STATE, MULTIPOINT, TEMPERATURE CONTROLLER

John B. Engleman, P.O. Box 511, Kingsport, Tenn. 37662

Filed May 13, 1968. Published Feb. 4, 1969
Class 219—501
2 Sheets Drawing. 11 Pages Specification

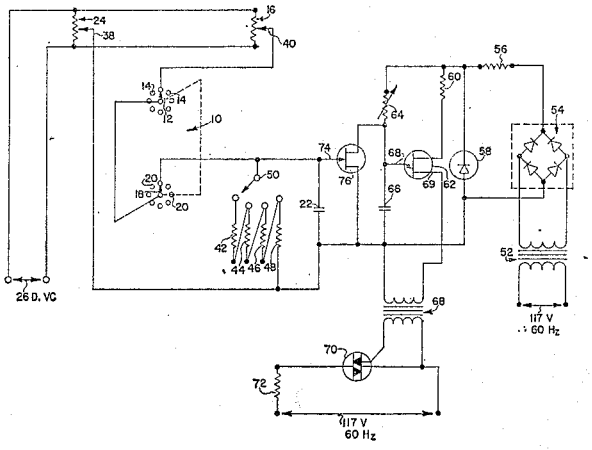

In a temperature controlling circuit the difference in a reference voltage and voltage produced by a temperature sensing means is impressed on the gate of a field effect transistor which acts as a proportioning shunt across the capacitor in an RC circuit connected to the gate of a unijunction transistor in circuit with one side of the primary of a transformer. The RC circuit and unijunction transistor form a relaxation osecillator to drive the transformer the secondary of which is connected to a silicon controlled rectifier connected in series with a source of alternating current and a heater.